(12) United States Patent
Voci et al.

(10) Patent No.: US 9,512,341 B2
(45) Date of Patent: *Dec. 6, 2016

(54) HEAT-CURING SEALANT COMPOSITIONS HAVING FAST SKIN FORMATION AND HIGH TENSILE STRENGTH

(75) Inventors: Antonio Voci, Zurich (CH); Andreas Kramer, Zurich (CH); Jan Olaf Schulenburg, Uster (CH); Michael Gutgsell, Uster (CH); Urs Burckhardt, Zurich (CH)

(73) Assignee: SIKA TECHNOLOGY AG, Baar (CH)

( * ) Notice: Subject to any disclaimer, the term of this patent is extended or adjusted under 35 U.S.C. 154(b) by 49 days.

This patent is subject to a terminal disclaimer.

(21) Appl. No.: 13/997,294

(22) PCT Filed: Dec. 19, 2011

(86) PCT No.: PCT/EP2011/073218
§ 371 (c)(1),
(2), (4) Date: Jul. 9, 2013

(87) PCT Pub. No.: WO2012/084806
PCT Pub. Date: Jun. 28, 2012

(65) Prior Publication Data
US 2013/0280536 A1    Oct. 24, 2013

(30) Foreign Application Priority Data

Dec. 23, 2010 (EP) .................................... 10196683

(51) Int. Cl.
| | |
|---|---|
| *B05D 3/02* | (2006.01) |
| *B32B 27/40* | (2006.01) |
| *C09D 175/04* | (2006.01) |
| *C09D 175/06* | (2006.01) |
| *C09D 175/08* | (2006.01) |
| *C09J 175/04* | (2006.01) |
| *C09J 163/00* | (2006.01) |
| *B32B 7/04* | (2006.01) |
| *B32B 15/08* | (2006.01) |
| *C25D 13/20* | (2006.01) |
| *C08L 61/32* | (2006.01) |
| *C08L 75/04* | (2006.01) |

(52) U.S. Cl.
CPC ............... *C09J 175/04* (2013.01); *B05D 3/02* (2013.01); *B32B 7/04* (2013.01); *B32B 15/08* (2013.01); *C09D 175/04* (2013.01); *C09D 175/06* (2013.01); *C09D 175/08* (2013.01); *C09J 163/00* (2013.01); *C25D 13/20* (2013.01); *B05D 2503/00* (2013.01); *C08L 61/32* (2013.01); *C08L 75/04* (2013.01); *Y10T 428/31511* (2015.04)

(58) Field of Classification Search
None
See application file for complete search history.

(56) References Cited

U.S. PATENT DOCUMENTS

| | | | | |
|---|---|---|---|---|
| 4,229,563 | A | * 10/1980 | Foscante et al. | 528/99 |
| 4,778,845 | A | * 10/1988 | Tschan et al. | 524/710 |
| 4,847,319 | A | 7/1989 | Bandlish | |
| 5,079,094 | A | * 1/1992 | Kimball | 428/416 |
| 5,894,071 | A | * 4/1999 | Merz et al. | 524/591 |
| 8,252,859 | B2 | * 8/2012 | Burckhardt | 524/173 |
| 2006/0149025 | A1 | 7/2006 | Burckhardt | |
| 2008/0087377 | A1 | * 4/2008 | Blank et al. | 156/273.3 |
| 2009/0288766 | A1 | 11/2009 | Kramer et al. | |
| 2010/0035041 | A1 | 2/2010 | Kramer et al. | |
| 2010/0101455 | A1 | 4/2010 | Burckhardt | |
| 2010/0190014 | A1 | * 7/2010 | Burckhardt | 428/423.1 |
| 2010/0212830 | A1 | * 8/2010 | Stumbeck et al. | 156/330 |
| 2010/0273005 | A1 | * 10/2010 | Kramer et al. | 428/414 |

FOREIGN PATENT DOCUMENTS

| | | |
|---|---|---|
| EP | 0 705 888 A1 | 4/1996 |
| EP | 1 384 709 A1 | 1/2004 |
| EP | 1 619 272 A1 | 1/2006 |
| EP | 2 017 260 A1 | 1/2009 |
| EP | 2030967 A1 * | 3/2009 |
| EP | 2060592 A1 * | 5/2009 |
| EP | 2 108 669 A1 | 10/2009 |
| JP | 2004-182935 A | 7/2004 |
| JP | 2004-335353 A * | 11/2004 |
| JP | 2005-132953 A | 5/2005 |
| JP | 2006-008934 A | 1/2006 |
| JP | 2007-138136 A | 6/2007 |
| JP | 2007-211142 A | 8/2007 |
| JP | 2010-533677 A | 10/2010 |
| WO | 2007/090875 A1 | 8/2007 |
| WO | WO 2008/077918 A1 | 7/2008 |
| WO | WO 2009/010522 A1 * | 1/2009 |
| WO | WO 2009/107697 A1 * | 9/2009 |

OTHER PUBLICATIONS

BASF, Lupranate MP102, Dec. 22, 2003, three pages.*
Jun. 25, 2013 Translation of International Preliminary Report on Patentability issued in International Patent Application No. PCT/EP2011/073218.
Jun. 5, 2012 Search Report issued in International Patent Application No. PCT/EP2011/073218 (with translation).
Dec. 7, 2015 Notice of Reasons for Rejection issued in Japanese Application No. 2013-545256.
Jun. 27, 2016 Office Action issued in Japanese Patent Application No. 2013-545256.

* cited by examiner

*Primary Examiner* — Robert Sellers
(74) *Attorney, Agent, or Firm* — Oliff PLC

(57) ABSTRACT

The present invention relates to heat-curing sealant compositions including at least epoxy resin, dicyanodiamide or an amine complex of a Lewis acid, polyurethane polymer (PUP) containing isocyanate groups and polyaldimine. These single component sealant compositions are characterized by a rapid skin formation and high tensile strength. Because of the short skin formation time, said compositions are optimally suitable for use as sealants in autobody work because they can be excellently layered on top of same.

20 Claims, 3 Drawing Sheets

HEAT-CURING SEALANT COMPOSITIONS HAVING FAST SKIN FORMATION AND HIGH TENSILE STRENGTH

TECHNICAL FIELD

The invention relates to the field of sealants for automotive body work in particular.

PRIOR ART

Individual metal plates are joined together in automotive body work. The metal plates used for this are oiled to reduce corrosion as much as possible. The metal plates required for this are cut to the proper shape by punching in particular and then are shaped. The cut surfaces have little or no oil coating due to the cutting.

The vehicle body will typically be passed through a CDC bath (CDC=cathodic dip coating) at the end of assembly of the body, so the body is coated with so-called CDC paint, which is then baked in a CDC oven. Good CDC coating over the full surface area forms the basis for long-term use of a vehicle because it makes a significant contribution toward corrosion resistance. However, it has been found that the CDC coating is not deposited at all or is deposited in only a very small thickness on the cut surfaces of the sheet metal plates in particular, which is why these locations are especially critical. There have therefore been previous attempts to apply sealants to these cut surfaces and/or cut edges. However, problems have often occurred in using such a sealant here. In some cases, the sealant does not adhere to the oil-coated areas near the cut surface. If the oil is removed in these areas before applying the sealant, then the problem is merely shifted from the cut surface to the edge of the sealant, so this is not actually a feasible approach to solving the problem. In other cases, the sealant is not yet fully cured when it passes through cleaning and the CDC bath, so it dissolves during the cleaning or in the CDC bath, which on the one hand leads to unwanted contamination of the CDC bath while on the other hand causing a weakening of the sealant. To solve this problem, WO 2008/077918 A1 has already proposed that a UV crosslinking or heat crosslinking sealant or a two-component sealant be used in the form of an epoxy resin sealant or a polyurethane sealant or a (meth) acrylate sealant. However, this has the major disadvantage that either additional equipment must be added to the production line for the heat crosslinking or UV crosslinking and/or problems may occur with the pot life and/or with the precise dosing of the two-component sealant. Furthermore, application installations for two-component sealants are considerably more expensive to acquire and maintain than those for single-component sealants.

SUMMARY OF THE INVENTION

The object of the present invention is therefore to make available a single-component sealing composition which adheres well to oil-coated sheet metal, need not be cured with heat or UV radiation before being immersed in a paint bath and nevertheless rapidly builds up strength.

It has surprisingly been found that heat curing sealant compositions according to claim 1 achieve this object.

The heat-curing sealant compositions have a dual curing mechanism. On the one hand, there is rapid formation of a skin due to the reaction of polyisocyanates with polyaldimines in contact with air and/or atmospheric humidity; this ensures that the sealant can pass through the CDC bath undamaged. The paint may be deposited on the sealant in a high-quality application. In another step, the sealant cures due to heat such as that prevailing in the CDC oven, to form a completely cured sealant, which has a high tensile strength.

The heat-curing sealant composition is therefore suitable for use as a sealant in automotive bodies in particular.

Additional aspects of the invention are the subject matter of further independent claims. Especially preferred embodiments of the invention are the subject matter of the dependent claims.

Methods of Implementing the Invention

The present invention relates to heat curing sealant compositions, which comprise:
- at least one epoxy resin (A) having more than one epoxy group per molecule on the average;
- at least one heat-activatable curing agent or accelerator (B) selected from the group consisting of dicyanodiamide or an amine complex of a Lewis acid;
- at least one polyurethane polymer (PUP) having isocyanate groups as well as
- at least one polyaldimine (PA).

The term "polymer" in the present document refers on the one hand to a group of macromolecules that are chemically uniform but are different with respect to the degree of polymerization, the molecular weight and the chain length and are synthesized by a polyreaction (polymerization, polyaddition, polycondensation). On the other hand, this term also includes derivatives of such a group of macromolecules from polyreactions, i.e., compounds obtained by reactions, for example, addition or substitution of functional groups on predetermined molecules and which may be chemically uniform or chemically heterogeneous. This term additionally also includes so-called prepolymers, i.e., reactive oligomeric precursors whose functional groups are involved in the structure of the macromolecules.

The term "polyurethane polymer" includes all polymers synthesized by the so-called diisocyanate polyaddition process. This also includes polymers which are almost or entirely free of urethane groups. Examples of polyurethane polymers include polyether polyurethanes, polyester polyurethanes, polyether polyureas, polyureas, polyester polyureas, polyisocyanurates and polycarbodiimides (Houben Weyl "Methoden der organischen Chemie" [Methods of Organic Chemistry], Thieme Verlag, Stuttgart 1987, Vol. E20, page 1561).

Substance names that begin with "poly-" such as polyisocyanate, polyaldimine, polyamine, polyol, polymercaptans or polyglycidyl ethers in the present document refer to substances formally containing two or more functional groups, which also appear in their name, per molecule.

The term "molecular weight" in the present document refers to the average molecular weight $M_n$.

Room temperature of the present documents is understood to be a temperature of 25° C.

Designations marked in bold such as A, PI, PA, A, B, B', PUP, PAM, ALD, Y1, Y2, C, F, SM, G, KA, KN, R, S, S2 or the like in the present document are used only to facilitate an understanding in reading and identification.

The term "vehicle" in this document is understood to refer to any means of transport by water, by land and by air. Such means of transport include in particular ships, wheeled vehicles, such as automobiles, buses, cars, trucks and rail vehicles such as streetcars and railway vehicles.

The term "primary amino group" in the present document refers to an amino group in the form of an $NH_2$ group bound to an organic radical. Consequently, a "primary amine" is a molecule having a primary amino group.

The term "secondary amino group" denotes an amino group in which the nitrogen atom is bound to two organic radicals, which together may also be part of a ring. Consequently, a "secondary amine" is a molecule which has a secondary amino group.

The term "tertiary amino group" denotes an amino group in which the nitrogen atom is bound to three organic radicals, such that two of these radicals together may also be part of a ring (=tertiary amine nitrogen). Consequently, a "tertiary amine" is a molecule which has a tertiary amino group.

"Aliphatic" refers to an amine or an amino group, in which the nitrogen atom is bound exclusively to aliphatic, cycloaliphatic or araliphatic radicals.

The term "epoxide group" or "epoxy group" is understood to refer to the structural element

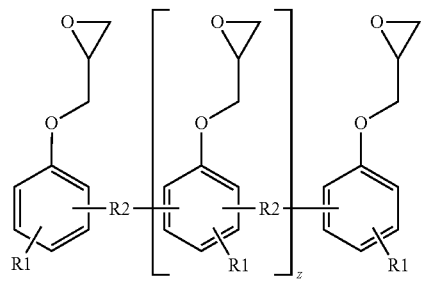

"Glycidyl ether" refers to an ether of 2,3-epoxy-1-propanol (glycidol).

The dashed lines in the formulas in this document in each case represent the bond between the respective substituent and the respective molecular radical.

The heat-curing sealant composition is a single-component composition.

A "single-component" composition in the present document denotes a curable composition in which all the ingredients of the composition are mixed and stored together in the same container and which are stable in storage over a lengthy period of time at room temperature, so they undergo little or no significant change in their use properties or application properties due to storage, and such a composition cures following application by the action of moisture and/or heat.

The epoxy resin (A) having an average of more than one epoxy group per molecule is preferably a liquid epoxy resin or a solid epoxy resin. The term "solid epoxy resin" is well-known to the skilled person in epoxy chemistry and is used in contrast with "liquid epoxy resins." The glass transition temperature of solid resins is higher than room temperature, i.e., they can be pulverized into pourable bulk powders at room temperature.

Preferred solid epoxy resins have formula (X)

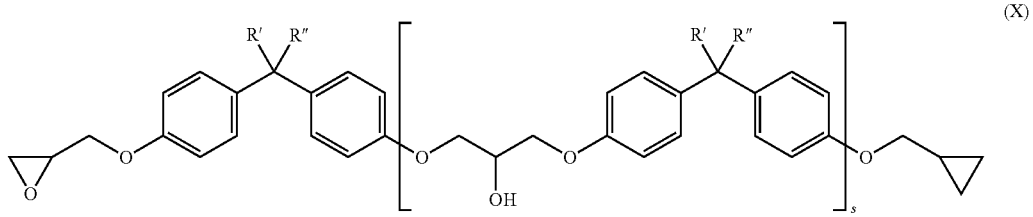

where the substituents R' and R", independently of one another, stand for either H or $CH_3$. In addition, the index s stands for a value of >1.5, in particular from 2 to 12.

Such solid epoxy resins are available commercially from Dow, Huntsman or Hexion, for example.

Compounds of formula (X) with an index s between 1 and 1.5 are known to those skilled in the art as semisolid epoxy resins. For the present invention, they are also considered to be solid resins. However, epoxy resins in the narrower sense are preferred, i.e., where the index s has a value of >1.5.

Preferred liquid epoxy resins have formula (XI)

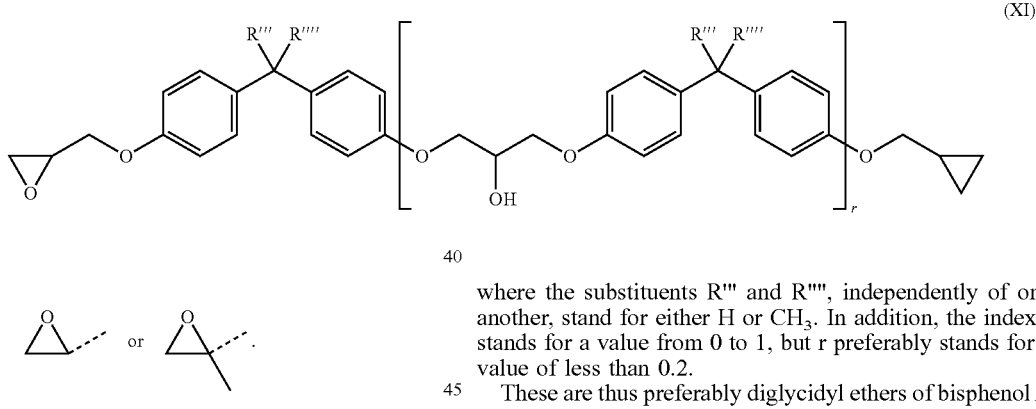

where the substituents R''' and R'''', independently of one another, stand for either H or $CH_3$. In addition, the index r stands for a value from 0 to 1, but r preferably stands for a value of less than 0.2.

These are thus preferably diglycidyl ethers of bisphenol A (DGEBA), of bisphenol F and of bisphenol A/F (the designation A/F here refers to a mixture of acetone with formaldehyde, used as reactants in the synthesis thereof). Such liquid resins are obtained, for example, as Araldite® GY 250, Araldite® PY 304, Araldite® GY 282 (Huntsman) or D.E.R.™ 331 or D.E.R.™ 330 (Dow) or Epikote 828 (Hexion).

In addition, so-called novolacs are also suitable as epoxy resin (A). These have the following formulas in particular:

where R2=

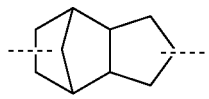

or CH$_2$,
R1=H or methyl and z=0 to 7.

These are in particular phenol or cresol novolacs (R2=CH$_2$).

Such epoxy resins are commercially available under the brand names EPN or ECN as well as Tactix® 556 from Huntsman or as the D.E.N.™ product series from Dow Chemical.

The epoxy resin (A) is preferably a liquid epoxy resin of the formula (XI). In an even more preferred embodiment, the heat curing epoxy resin composition contains at least one liquid epoxy resin of formula (XI) as well as at least one solid epoxy resin of formula (X).

The epoxy resin (A) is typically used in an amount between 1% and 50% by weight, in particular between 3% and 30% by weight, preferably between 5% and 20% by weight, based on the weight of the heat curing sealant composition.

The weight ratio of epoxy resin (A) to polyurethane polymer (PUP) Containing isocyanate groups is preferably between 0.1:1 and 0.5:1, in particular between 0.15:1 and 0.4:1, preferably between 0.2:1 and 0.3:1.

Furthermore, the heat-curing sealant composition also contains at least one heat-activatable curing agent or accelerator (B) selected from the group consisting of dicyanodiamide or an amine complex of a Lewis acid. Both dicyanodiamide and the amine complexes of Lewis acids are mostly stable at room temperature in the presence of epoxy resins. Only at elevated temperatures do they become active and lead to curing of the epoxy resin. The activation temperature depends on the heat-activatable curing agent or accelerator (B) used and is typically more than 120° C.

The heat-activatable curing agent for epoxy resin in the form of dicyanodiamide or an amine complex of a Lewis acid is an essential element for the present invention. Although dicyanodiamide and amine complexes of a Lewis acid are heat-activatable curing agents or accelerators for epoxy resins that are known to those skilled in the art in epoxy chemistry, it has surprisingly been found that adding them to mixtures of polyisocyanates also has an extremely advantageous effect on skin formation as well as adhesion and tensile strength.

It is preferable for the dicyanodiamide to be present in a finely divided form and to have an average particle size of less than 12 µm, in particular of 1 µm to 10 µm, preferably between 5 and 9 µm. The particle size is determined here by screening.

Said amine complexes of a Lewis acid are complexes formed between an amine and a Lewis acid. Suitable amines include in particular amines with a molecular weight of less than 130 g/mol, in particular between 40 and 110 g/mol, preferably between 40 and 90 g/mol. These are tertiary or secondary amines in particular. Suitable tertiary amines include in particular trialkylamines such as triethylamine, triethylamine, tripropylamine, tributylamine or dimethylpropylamine. Furthermore, aromatic tertiary amines such as dimethylbenzylamine or dimethylaminopyridine as well as nitrogen aromatic amines such as pyridine are also suitable.

Secondary amines include in particular dialkylamines such as dimethylamine, diethylamine, dipropylamine or dibutylamine as well as cycloaliphatic secondary amines such as pyrrolidine, piperidine or morpholine.

The Lewis acid may be in particular boron trihalides, in particular BCl$_3$ or BF$_3$. BCl$_3$ is preferred.

Both the BCl$_3$ diethylamine complex and the BCl$_3$ amine complex, which can be obtained as OMICURE™ BC-120 (from Emerald Performance Materials) have proven to be especially suitable amine complexes of a Lewis acid.

The dicyanodiamide and/or the amine complex of a Lewis acid is typically used in an amount between 0.05% and 7% by weight, in particular between 0.1% and 5% by weight, preferably between 0.25% and 2% by weight, based on the weight of the heat-curing sealant composition.

The heat-curing sealant composition also contains at least one polyurethane polymer (PUP) having isocyanate groups.

A suitable polyurethane polymer (PUP) can be obtained in particular by the reaction of at least one polyol with at least one polyisocyanate. This reaction can take place by reacting the polyol and the polyisocyanate by conventional methods, for example, at temperatures of 50° C. to 100° C., optionally with the joint use of suitable catalysts, such that the polyisocyanate is dosed so that its isocyanate groups are present in a stoichiometric excess in relation to the hydroxyl groups of the polyol. The polyisocyanate is advantageously dosed so that an NCO/OH ratio of 1.3:1 to 5:1 is maintained, in particular 1.5:1 to 3:1. The term "NCO/OH ratio" is understood to refer to the ratio of the number of isocyanate groups used to the number of hydroxyl groups used. A free isocyanate group content of 0.5 to 15% by weight, especially preferably 0.5 to 5% by weight, preferably remains in the polyurethane polymer (PUP) after the reaction of all the hydroxyl groups of the polyol.

The polyurethane polymer (PUP) may optionally be synthesized with the concurrent use of plasticizers, where the plasticizers used do not contain any groups that are reactive with isocyanates.

For example, the following commercial polyols or mixtures thereof may be used as the polyols for synthesis of a polyurethane polymer (PUP):

Polyoxyalkylene polyols, also known as polyether polyols or oligoetherols, which are polymerization products of ethylene oxide, 1,2-propylene oxide, 1,2- or 2,3-butylene oxide, oxetane, tetrahydrofuran or mixtures thereof, optionally polymerized with the help of an initiator molecule having two or more active hydrogen atoms such as, for example, water, ammonia or compounds having several OH or NH groups such as, for example, 1,2-ethanediol, 1,2-propanediol and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline as well as mixtures of the compounds listed above. It is also possible to use polyoxyalkylene polyols, which have a low degree of unsaturation (measured according to ASTM D-2849-69 and given in milliequivalents of unsaturation per gram of polyol (mEq/g)), synthesized with the help of so-called double-metal cyanide complex catalysts (DMC catalysts), as well as polyoxyalkylene polyols having a higher degree of unsaturation, synthesized with the help of anionic catalysts, for example, such as NaOH, KOH, CsOH or alkali alkoxides. Polyoxyalkylenediols or polyoxyalkylenetriols, in particular polyoxyethylenediols and -triols and polyoxypropylenediols and -triols are especially suitable. Polyoxyalkylenediols and -triols having a degree of unsaturation of less than 0.02 mEq/g and having a molecular weight in the range of 1000-30,000 g/mol as well as polyoxypropylenediols and -triols having a molecular weight of 400-8000 g/mol are especially suitable. Also especially suitable are so-called ethylene oxide-terminated (EO endcapped, ethylene oxide end-capped) polyoxypropylene polyols. The latter are special polyoxypropylene-polyoxyethylene polyols, which are obtained, for example, by further alkoxylation of pure polyoxypropylene polyols, in particular polyoxypropylenediols and -triols, after the end of the polypropoxylation reaction with ethylene oxide and therefore they contain primary hydroxyl groups.

Styrene-acrylonitrile-grafted or acrylonitrile-methyl methacrylate-grafted polyether polyols.

Polyester polyols, also known as oligoesterols, synthesized by known methods, in particular by polycondensation of hydroxycarboxylic acids or polycondensation of aliphatic and/or aromatic polycarboxylic acids with alcohols having a valence of 2 or more.

Suitable polyester polyols include in particular those synthesized from divalent to trivalent, in particular divalent alcohols such as, for example, ethylene glycol, diethylene glycol, propylene glycol, dipropylene glycol, neopentyl glycol, 1,4-butanediol, 1,5-pentanediol, 3-methyl-1,5-hexanediol, 1,6-hexanediol, 1,8-octanediol, 1,10-decanediol, 1,12-dodecanediol, 1,12-hydroxystearyl alcohol, 1,4-cyclohexane dimethanol, dimeric fatty acid diol (dimer diol), hydroxypivalic acid neopentyl glycol ester, glycerol, 1,1,1-trimethylol propane or mixtures of the alcohols mentioned above with organic di- or tricarboxylic acids, in particular dicarboxylic acids or the anhydrides or esters thereof, such as, for example, succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic anhydride, isophthalic acid, terephthalic acid, dimethyl terephthalate, hexahydrophthalic acid, trimellitic acid and trimellitic anhydride or mixtures of the acids mentioned above as well as polyester polyols of lactones such as, for example, c-caprolactone and initiators, such as the divalent or trivalent alcohols mentioned above.

Especially suitable polyester polyols are polyester diols.

Polycarbonate polyols such as those accessible by reacting, for example, the alcohols mentioned above (which are used for synthesis of the polyester polyols) with dialkyl carbonates, diaryl carbonates or phosgene.

Blocked copolymers which have at least two hydroxyl groups and at least two different blocks with a polyether, a polyester and/or polycarbonate structure of the type described above, in particular polyether-polyester polyols.

Polyacrylate and polymethacrylate polyols.

Polyhydroxy-functional fats and oils, for example, natural fats and oils, in particular castor oil; or so-called oleochemical polyols obtained by chemical modification of natural fats and oils, for example, the epoxy polyesters and/or epoxy polyethers obtained by epoxidation of unsaturated oils and subsequent ring opening with carboxylic acids and/or alcohols, or polyols obtained by hydroformylation and hydrogenation of unsaturated oils; or polyols obtained from natural fats and oils by degradation processes such as alcoholysis or ozonolysis and subsequent chemical linkage, for example, by transesterification or dimerization of the resulting degradation products or derivatives thereof. Suitable degradation products of natural fats and oils include in particular fatty acids and fatty alcohols as well as fatty acid esters, in particular the methyl esters (FAME), which can be derivatized by hydroformylation and hydrogenation, for example, to form hydroxy fatty acid esters.

Polyhydrocarbon polyols, also known as oligohydrocarbonols, such as, for example, polyhydroxy-functional polyolefins, polyisobutylenes, polyisoprenes; polyhydroxy-functional ethylene-propylene, ethylene-butylene or ethylene-propylene-diene copolymers, such as those produced by the company Kraton Polymers, for example; polyhydroxy-functional polymers of dienes, in particular 1,3-butadiene, which may also be synthesized by anionic polymerization in particular; polyhydroxy-functional copolymers of dienes, such as 1,3-butadiene or diene mixtures and vinyl monomers such as styrene, acrylonitrile, vinyl chloride, vinyl acetate, vinyl alcohol, isobutylene and isoprene, for example, polyhydroxy-functional acrylonitrile-butadiene copolymers, such as those that can be synthesized from epoxies or amino alcohols and carboxy-terminated acrylonitrile-butadiene copolymers (for example, those available commercially under the brand names Hypro® (previously Hycar®) CTBN and CTBNX and ETBN from Nanoresins AG, Germany and/or Emerald Performance Materials LLC; as well as hydrogenated polyhydroxy-functional polymers or copolymers of dienes.

The polyols mentioned above preferably have an average molecular weight of 250-30,000 g/mol, in particular 400-20,000 g/mol, and they preferably have an average OH functionality in the range of 1.6 to 3.

Preferred polyols include polyether polyols, polyester polyols, polycarbonate polyols, polyacrylate polyols and polyhydrocarbon polyols, preferably diols and triols. Especially preferred are polyhydrocarbon polyols, in particular polyhydroxy-functional polyolefins and polyhydroxy-functional polymers of dienes, in particular 1,3-butadiene.

In addition to the polyols mentioned above, small amounts of low-molecular divalent or polyvalent polyols such as, for example, 1,2-ethanediol, 1,2-propanediol and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexane dimethanol, hydrogenated bisphenol A, dimeric fatty alcohols, 1,1,1-trimethylol ethane, 1,1,1-trimethylolpropane, glycerol, pentaerythritol, sugar alcohols such as xylitol, sorbitol or mannitol, sugars such as sucrose, other higher valency alcohols, low-molecular alkoxylation products of the divalent and polyvalent alcohols mentioned above and mixtures of the alcohols mentioned above may also be used in the synthesis of the polyurethane polymer (PUP). Likewise, small amounts of polyols with an average OH functionality of more than 3 may be used, for example, sugar polyols.

Aromatic or aliphatic polyisocyanates, in particular diisocyanates, are used as the polyisocyanate for synthesis of a polyurethane polymer (PUP) that contains isocyanate groups.

Suitable aromatic polyisocyanates include in particular monomeric di- or triisocyanates such as 2,4- and 2,6-toluoylene diisocyanate and any mixtures of these isomers (TDI), 4,4'-, 2,4'- and 2,2'-diphenylmethanediisocyanate and any mixtures of these isomers (MDI), mixtures of MDI and MDI homologs (polymeric MDI or PMDI), 1,3- and 1,4-phenylene diisocyanate, 2,3,5,6-tetramethyl-1,4-diisocyanatobenzene, naphthalene-1,5-diisocyanate (NDI), 3,3'-dimethyl-4,4'-diisocyanatodiphenyl (TODI), dianisidinediisocyanate (DAM), 1,3,5-tris-(isocyanatomethyl)benzene, tris-(4-isocyanatophenyl)methane, tris-(4-isocyanatophenyl)thiophosphate, oligomers and polymers of the isocyanates mentioned above as well as any mixtures of the isocyanates mentioned above. MDI and TDI are preferred.

Suitable aliphatic polyisocyanates include in particular monomeric di- or triisocyanates such as 1,4-tetramethylene diisocyanate, 2-methylpenta-methylene 1,5-diisocyanate, 1,6-hexamethylene diisocyanate (HDI), 2,2,4- and 2,4,4-trimethyl-1,6-hexamethylene diisocyanate (TMDI), 1,10-decamethylene diisocyanate, 1,12-dodecamethylene diisocyanate, lysine and lysine ester diisocyanate, cyclohexane-1,3- and -1,4-diisocyanate, 1-methyl-2,4- and 2,6-diisocyanatocyclohexane and any mixtures of these isomers (HTDI or $H_6$TDI), 1-isocyanato-3,3,5-trimethyl-5-isocyanatomethyl cyclohexane (=isophorone diisocyanate or IPDI), perhydro-2,4'- and -4,4'-diphenylmethane diisocyanate (HMDI or $H_{12}$MDI), 1,4-diisocyanato-2,2,6-trimethylcyclohexane (TMCDI), 1,3- and 1,4-bis-(isocyanatomethyl) cyclohexane, m- and p-xylylene diisocyanate (m- and p-XDI), m- and p-tetramethyl-1,3- and -1,4-xylylene diisocyanate (m- and p-TMXDI), bis-(1-isocyanato-1-methylethyl)naphthalene, dimeric and trimeric fatty acid isocyanates such as 3,6-bis-(9-isocyanatononyl)-4,5-di-(1-heptenyl)cyclohexene(dimeryl diisocyanate), α,α,α',α',α",α"-hexamethyl-1,3,5-mesitylene triisocyanate, oligomers and polymers of the isocyanates mentioned above as well as any mixtures of the isocyanates mentioned above. HDI and IPDI are preferred.

Polyurethane polymers (PUP) with aromatic isocyanate aromatic groups are preferred.

The amount of polyurethane polymers (PUP) containing isocyanate groups is typically between 10% and 70% by weight, in particular between 15 and 50% by weight, preferably between 20% and 40% by weight, based on the weight of the heat-curing sealant composition.

The polyurethane polymer (PUP) containing isocyanate groups is especially preferably synthesized in the presence of an epoxy resin (A) with an average of more than one epoxy group per molecule, in particular liquid epoxy resin of formula (XI) in a premix (VM). It is clear to those skilled in the art that a premix (VM) will also contain, in addition to the polyurethane polymer (PUP) containing isocyanate groups and the epoxy resin (A), certain amounts of reaction products of the polyurethane polymer (PUP) containing isocyanate groups and/or the polyisocyanates used to synthesize the same, with the hydroxy-functional substances that occur in epoxy resin (A), in particular the compound of formula (XII).

The premix (VM) thus contains both isocyanate groups and epoxy groups.

The heat-curing sealant composition also contains at least one polyaldimine (PA).

Polyaldimines (PA) can be synthesized from polyamines (PAM) with two or more primary amino groups and aldehydes.

Suitable polyamines (PAM) having two or more primary amino groups that are suitable in particular include:

aliphatic, cycloaliphatic or araliphatic diamines, for example, ethylenediamine, 1,2-propanediamine, 1,3-propanediamine, 2-methyl-1,2-propanediamine, 2,2-dimethyl-1,3-propanediamine, 1,3-butanediamine, 1,4-butanediamine, 1,3-pentanediamine (DAMP), 1,5-pentanediamine, 1,5-diamino-2-methylpentane (MPMD), 1,6-hexanediamine, 2,5-dimethyl-1,6-hexanediamine, 2,2,4- and 2,4,4-trimethylhexamethylenediamine (TMD), 1,7-heptanediamine, 1,8-octanediamine, 1,9-nonanediamine, 1,10-decanediamine, 1,11-undecanediamine, 1,12-dodecanediamine, and methylbis-(3-aminopropyl)amine, 1,2-, 1,3- and 1,4-diaminocyclohexane, bis-(4-aminocyclohexyl) methane, bis-(4-amino-3-methylcyclohexyl)methane, bis-(4-amino-3-ethylcyclohexyl)methane, bis-(4-amino-3,5-dimethyl-cyclohexyl)methane, bis-(4-amino-3-ethyl-5-methylcyclohexyl)methane (M-MECA), 1-amino-3-aminomethyl-3,5,5-trimethylcyclohexane (=isophorone-diamine or IPDA), 2- and 4-methyl-1,3-diaminocyclohexane and mixtures thereof, 1,3- and 1,4-bis-(aminomethyl)cyclohexane, 2,5(2,6)-bis-(amino-methyl)bicyclo[2.2.1]heptane (NBDA), 3(4),8(9)-bis-(aminomethyl)tricyclo-[5.2.1.0$^{2,6}$]decane, 1,4-diamino-2,2,6-trimethylcyclohexane (TMCDA), 3,9-bis-(3-aminopropyl)-2,4,8,10-tetraoxaspiro[5.5]undecane as well as 1,3- and 1,4-xylylenediamine;

aliphatic diamines containing ether groups, for example, bis-(2-aminoethyl)ether, 3,6-dioxaoctane-1,8-diamine, 4,7-dioxadecane-1-1,10-diamine, 4,7-dioxadecane-2,9-diamine, 4,9-dioxadodecane-1,12-diamine, 5,8-dioxadodecane-3,10-diamine and higher oligomers of these diamines, bis-(3-aminopropyl) polytetrahydrofurans and other polytetrahydrofuran diamines having molecular weights in the range of, for example, 350 to 5200 as well as polyoxyalkylenediamines. The latter are typically products of the amination of polyoxyalkylenediols and can be obtained, for example, under the name Jeffamine® (from Huntsman Chemicals), under the name polyether amine (from BASF) or under the name PC Amine® (from Nitroil). Especially suitable polyoxyalkylenediamines include Jeffamine® D-230, Jeffamine® D-400, Jeffamine® D-2000, Jeffamine® D-4000, Jeffamine® XTJ-511, Jeffamine® ED-600, Jeffamine® ED-900, Jeffamine® ED-2003, Jeffamine® XTJ-568, Jeffamine® XTJ-569, Jeffamine® XTJ-

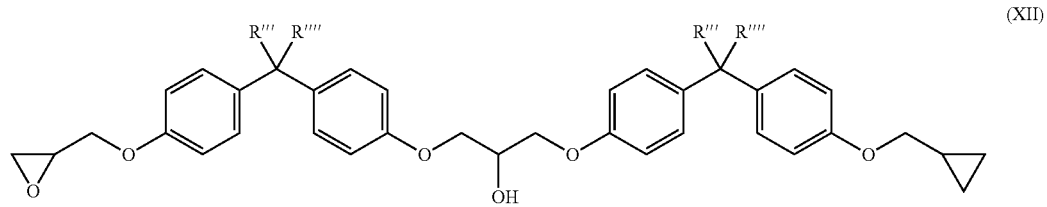

(XII)

523, Jeffamine® XTJ-536, Jeffamine® XTJ-542, Jeffamine® XTJ-559, polyether amine D 230, polyether amine D 400 and polyether amine D 2000, PC Amine® DA 250, PC Amine® DA 400, PC Amine® DA 650 and PC Amine® DA 2000;

aliphatic triamines such as 4-aminomethyl-1,8-octane diamine, 1,3,5-tris(aminomethyl)benzene, 1,3,5-tris-(aminomethyl)cyclohexane:

primary polyoxyalkylene triamines, which are typically the products of the amination of polyoxyalkylenetriols and can be obtained, for example, under the brand name Jeffamine® (from Huntsman Chemicals), under the name polyether amine (from BASF) or under the name PC Amine® (from Nitroil) such as for example, Jeffamine® T-403, Jeffamine® T-5000; polyether amine T 403, polyether amine T 5000; and PC Amine® TA 403, PC Amine® TA 5000.

Preferred polyamines (PAM) include polyamines selected from the group consisting of 1,6-hexamethylenediamine, MPMD, DAMP, IPDA, TMD, 1,3-xylylenediamine, 1,3-bis-(aminomethyl)cyclohexane, bis-(4-aminocyclo-hexyl)methane, bis-(4-amino-3-methyl-cyclohexyl)methane, 3(4),8(9)-bis-(aminomethyl)tricyclo-[5.2.1.0$^{2,6}$]decane, 1,2-, 1,3- and 1,4-diaminocyclohexane, 1,4-diamino-2,2,6-trimethylcyclohexane, 3,6-dioxaoctane-1,8-diamine, 4,7-dioxadecane-1,10-diamine, 4-aminomethyl-1,8-octane diamine and polyoxyalkylene polyamines having two or three amino groups, in particular the products D-230, D-400, D-2000, T-403 and T-5000 from Huntsman that are available under the brand name Jeffamine® as well as similar compounds from BASF or Nitroil as well as mixtures of the polyamines mentioned above. The diamines mentioned above are especially preferred polyamines (PAM).

Essentially any aldehydes are suitable as said aldehydes.

It has been found that it is advantageous if the polyaldimine (PA) does not have a hydrogen atom on the carbon atom in α-position to the carbon of the aldimino group. Such aldimines cannot form any tautomeric forms (enamine)—in contrast with aldimines which have hydrogen atoms in a-position to the carbon (see formula diagram below):

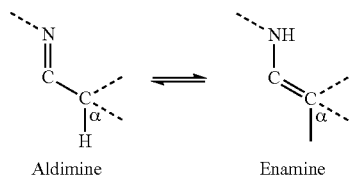

Aldimine      Enamine

It has been found that compositions which are especially stable in storage can be obtained with such polyaldimines which do not have hydrogen atoms in a-position.

Such polyaldimines can be synthesized from polyamines (PAM) having two or more primary amino groups according to the formula and aldehydes of formula (II) or (III)

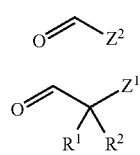

(II)

(III)

where $R^1$ and $R^2$, independently of one another, each stand for a monovalent hydrocarbon radical having 1 to 12 carbon atoms or $R^1$ and $R^2$ together stand for a divalent hydrocarbon radical having 4 to 12 carbon atoms that is part of an optionally substituted carbocyclic ring having 5 to 8 carbon atoms, preferably 6 carbon atoms.

In addition, $Z^1$ stands for a monovalent hydrocarbon radical having 1 to 32 carbon atoms, optionally having at least one heteroatom, in particular oxygen in the form of ether, carbonyl or ester groups or in particular nitrogen in the form of tertiary amino groups.

In addition $Z^2$ stands either for a substituted or unsubstituted aryl or heteroaryl group which has a ring size of 5 to 8 atoms, preferably 6 atoms or for

wherein $R^8$ stands for a hydrogen atom or for an alkoxy group or for a substituted or unsubstituted alkenyl or arylalkenyl group having at least 6 carbon atoms.

Examples of such aldehydes of formula (II) include aromatic aldehydes such as benzaldehyde, 2- and 3- and 4-tolualdehyde, 4-ethyl, 4-propyl, 4-isopropyl and 4-butyl benzaldehyde, 2,4-dimethyl benzaldehyde, 2,4,5-trimethyl benzaldehyde, 4-acetoxy benzaldehyde, 4-anisaldehyde, 4-ethoxy benzaldehyde, the isomeric di- and trialkoxy benzaldehydes, 2-, 3- and 4-nitrobenzaldehyde, 2-, 3- and 4-formyl pyridine, 2-furfuraldehyde, 2-thiophene carbaldehyde, 1- and 2-naphthyl aldehyde, 3- and 4-phenyloxy benzaldehyde, quinoline 2-carbaldehyde and its 3-, 4-, 5-, 6-, 7- and 8-positional isomers as well as anthracene 9-carbaldehyde and also glyoxal, glyoxalic acid esters such as glyoxalic acid methyl ester, cinnamaldehyde and substituted cinnamaldehydes.

Examples of aldehydes of formula (III) include for example pivalaldehyde (=2,2-dimethylpropanal), 2,2-dimethylbutanal, 2,2-diethylbutanal, 1-methylcyclopentane carboxaldehyde, 1-methylcyclohexane carboxaldehyde, 2,2-dimethyl-3-phenylpropanal and 2,2-dimethyl-3-p-toluoylpropanal; ethers of 2-hydroxy-2-methylpropanal and alcohols such as propanol, isopropanol, butanol and 2-ethylhexanol; esters of 2-formyl-2-methylpropionic acid or 3-formyl-3-methylbutyric acid and alcohols such as propanol, isopropanol, butanol and 2-ethylhexanol; esters of 2-hydroxy-2-methylpropanal and carboxylic acids such as butyric acid, isobutyric acid and 2-ethylhexanoic acid; as well as ethers and esters of 2,2-disubstituted 3-hydroxypropanals, butanals or similar higher aldehydes, in particular 2,2-dimethyl-3-hydroxypropanal as well as the aldehydes of formula (IV) that are described below as being especially suitable.

Polyaldimines of formula (I) have proven to be especially suitable

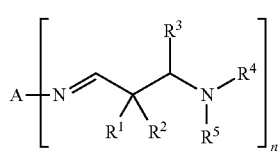

(I)

where A stands for the radical of an amine after removal of n primary aliphatic amino groups, said radical not containing any active hydrogen atoms. In addition, n stands for 2 or 3 or 4 or 5, preferably for 2 or 3. Furthermore, either $R^1$ and $R^2$, independently of one another, each stands for a monovalent hydrocarbon radical having 1 to 12 carbon atoms or $R^1$ and $R^2$ together stand for a divalent hydrocarbon radical having 4 to 12 carbon atoms, which is part of an optionally substituted carbocyclic ring having 5 to 8 carbon atoms, preferably 6 carbon atoms.

$R^3$ stands for a hydrogen atom or an alkyl group or an aralkyl group or an alkoxycarbonyl group, in particular having 1 to 12 carbon atoms.

Either $R^4$ and $R^5$, independently of one another, each stands for a monovalent aliphatic, cycloaliphatic or aralipahatic radical having 1 to 20 carbon atoms, optionally containing heteroatoms in the form of ether oxygen or tertiary amine nitrogen, or $R^4$ and $R^5$ together stand for a divalent aliphatic radical having 3 to 20 carbon atoms, which is part of an optionally substituted heterocyclic ring having 5 to 8 ring atoms, preferably 6 ring atoms, wherein this ring also contains, in addition to the nitrogen atom, other heteroatoms in the form of ether oxygen or tertiary amine nitrogen.

In addition, to synthesize an aldimine of formula (I), at least one sterically hindered aliphatic aldehyde (ALD) of formula (IV) is used:

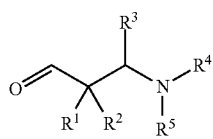

(IV)

wherein $R^1$, $R^2$, $R^3$, $R^4$ and $R^5$ have the meanings already given above.

$R^1$ and $R^2$ preferably each stand for a methyl group and $R^3$ preferably stands for a hydrogen atom.

$R^4$ and $R^5$ preferably, independently of one another, each stand for methyl, ethyl, propyl, isopropyl, butyl, 2-ethylhexyl, cyclohexyl or benzyl or together—including the nitrogen atom—they form a ring, in particular a pyrrolidine, piperidine, morpholine or N-alkylpiperazine ring, where this ring is optionally substituted.

Aldehydes (ALD) of formula (IV) can be obtained in particular as the product of a Mannich reaction or an α-aminoalkylation analogous to the Mannich reaction as is known from the technical literature and which may therefore also be referred to Mannich bases. An aldehyde (Y1) of formula (V), an aldehyde (Y2) of formula (VI) and a secondary aliphatic amine (C) of formula (VII) are reacted here, with elimination of water, to form an aldehyde (ALD)

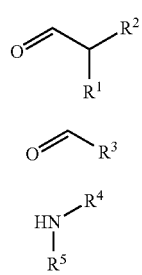

(V)

(VI)

(VII)

wherein $R^1$, $R^2$, $R^3$, $R^4$ and $R^5$ have the meanings already given above.

This reaction may be performed either with the free reagents, i.e., the aldehyde of formula (V) (Y1), the aldehyde of formula (VI) (Y2) and the amine (C) or the reagents may be used in a partially or completely derivatized form. Thus the aldehyde (Y1) may be used as an enolate, as an enol ether, in particular as a silylenol ether, or as an enamine. The aldehyde (Y2) may be used, for example, in the form of an oligomer—in particular in the case of formaldehyde as 1,3,5-trioxane or as paraformaldehyde—or as a hydrate, hemiacetal, acetal, N,O-acetal, aminal or hemiaminal. Finally, the secondary aliphatic amine (C) may be used in the form of a salt, in particular as an amine hydrochloride or as an amine hydrosulfate or as a silylamine. It is possible to use a portion of the reagents in free form and a portion in derivatized form or to use them only in derivatized forms. When using reagents in derivatized form, the aldehyde (ALD) is also obtained in derivatized form, for example, as a salt under some circumstances. In this case, it may be converted to the free form according to formula (IV) by suitable workup. It may be appropriate to additionally use additives such as Lewis acids or catalysts in such conversion reactions, depending on the conditions.

In addition, the reaction may be carried out as a one-pot reaction, in which all three reagents can react with one another at the same time; or a stepwise procedure may be selected by reacting first two of the reagents with one another and then reacting the resulting intermediate with the third reagent, where the intermediate may or may not be isolated. Such intermediates that are suitable include in particular iminium salts, which are obtained from the reaction of an aldehyde (Y2) in free or derivatized form with a salt of a secondary aliphatic amine (C) and which can be reacted with an aldehyde (Y1) in free or derivatized form to form the corresponding salt of an aldehyde (ALD) of formula (IV). Such a stepwise procedure may be advantageous in permitting milder reaction conditions and thus giving a higher product yield.

In addition, the reaction may take place using solvents, in particular polar solvents such as water or alcohols, or the reaction may be performed without using solvents.

In a preferred specific embodiment, the reaction is carried out as a one-pot reaction with all the reagents in free form and the aldehyde (ALD) is purified by distillation after completing the reaction. It is preferable not to use any organic solvents.

For example, the following aldehydes are suitable as the aldehyde (Y1) of formula (V): isobutyraldehyde, 2-methylbutyraldehyde, 2-ethylbutyraldehyde, 2-methylvaleraldehyde, 2-ethylcaproaldehyde, cyclopentane carboxaldehyde, cyclohexanecarboxaldehyde, 1,2,3,6-tetrahydrobenzaldehyde, 2-methyl-3-phenylpropionaldehyde, 2-phenylpropionaldehyde and diphenylacetaldehyde. Isobutyraldehyde is preferred.

Suitable examples of the aldehyde (Y2) of formula (VI) include the following aldehydes: formaldehyde, acetaldehyde, propionaldehyde, butyr-aldehyde, isobutyraldehyde, phenylacetaldehyde, benzaldehyde and substituted benzaldehydes as well as glyoxylic acid esters, in particular glyoxylic acid ethyl esters. Formaldehyde is preferred.

Examples of suitable amines (C) of formula (VII) include the following secondary aliphatic amines: dimethylamine, diethylamine, dipropylamine, diisopropylamine, dibutylamine, diisobutylamine, di-sec-butylamine, dihexylamine, di-(2-ethylhexyl)amine, dicyclohexylamine, N-methylbutylamine, N-ethylbutylamine, N-methyl cyclohexylamine, N-ethyl cyclohexylamine, di-2-methoxyethylamine, pyrrolidine, piperidine, N-methylbenzylamine, N-isopropylbenzylamine, N-tert-butyl benzylamine, dibenzylamine, morpholine, 2,6-dimethylmorpholine, bis-(3-dimethylaminopropyl) amine, N-methyl or N-ethylpiperazine.

Preferred examples of the amine (C) include dimethylamine, diethylamine, diisopropylamine, dibutylamine, diisobutylamine, N-methyl-cyclohexylamine, N-methyl benzylamine, N-isopropyl benzylamine, N-tert-butylbenzylamine, dibenzylamine, pyrrolidine, piperidine, morpholine, 2,6-dimethylmorpholine, N-methyl- and N-ethyl piperazine.

The aldehyde (ALD) is preferably synthesized by the reaction of isobutyraldehyde as the aldehyde (Y1) of the formula (V), formaldehyde as the aldehyde (Y2) of formula (VI) and one of the amines selected from the group consisting of dimethylamine, diethylamine, diisopropylamine, dibutylamine, diisobutylamine, N-methylcyclohexylamine, N-methylbenzylamine, N-isopropylbenzylamine, N-tert-butylbenzylamine, dibenzylamine, pyrrolidine, piperidine, morpholine, 2,6-dimethylmorpholine, N-methyl- and N-ethyl-piperazine as the amine (C) of formula (VII).

Preferred aldehydes (ALD) include 2,2-dimethyl-3-dimethyl aminopropanal, 2,2-dimethyl-3-diethyl aminopropanal, 2,2-dimethyl-3-dibutyl-aminopropanal, 2,2-dimethyl-3-(N-pyrrolidino)propanal, 2,2-dimethyl-3-(N-piperidino)propanal, 2,2-dimethyl-3-(N-morpholino)propanal, 2,2-dimethyl-3-(N-(2,6-dimethyl)morpholino)propanal, 2,2-dimethyl-3-(N-(4-methylpiperazino))-propanal, 2,2-dimethyl-3-(N-(4-ethylpiperazino))propanal, 2,2-dimethyl-3-(N-benzylmethylamino)propanal, 2,2-dimethyl-3-(N-benzylisopropylamino)-propanal and 2,2-dimethyl-3-(N-cyclohexylmethylamino)propanal. The preferred aldehydes (ALD) have a comparatively low basicity.

Aldimines of formula (I) can be synthesized directly from polyamines (PAM) having two or more primary amino groups and aldehydes (ALD) of formula (IV), as already described above, by reacting a polyamine (PAM) with an aldehyde (ALD) in a condensation reaction with the removal of water.

It has been found that when using polyaldimines of formula (I), an improved storage stability of the heat-curing sealant composition can be achieved.

Polyaldimine (PA) is typically used in an amount between 0.3% and 10% by weight, in particular between 0.5% and 5% by weight, preferably between 1% and 3% by weight, based on the weight of the heat-curing sealant composition.

In addition, the polyaldimine (PA) is preferably present in the sealant composition in an amount such that the ratio of the number of aldimino groups to the number of isocyanate groups has a value of 0.2:1 to 0.8:1, in particular of 0.3:1 to 0.7:1.

The heat-curing sealant composition described here may contain additional ingredients as needed. In particular these include fillers (F), polyisocyanates (PI), reactive diluents containing epoxy groups (G), heat-activatable curing agents or accelerators (B') and catalysts, stabilizers, in particular heat and/or light stabilizers, thixotropy agents, plasticizers, solvents, blowing agents, dyes and pigments, corrosion preventing agents, surfactants, foam suppressants, adhesion promoters and impact strength modifiers (SM).

The fillers (F) are preferably mica, talc, kaolin, wollastonite, feldspar, syenite, chlorite, bentonite, montmorillonite, calcium carbonate (chalk, precipitated or ground), dolomite, quartz, silicic acids (pyrogenic or precipitated), cristobalites, calcium oxide, aluminum hydroxide, magnesium oxide, ceramic hollow beads, glass hollow beads, organic hollow beads, glass beads, carbon black, graphite, metal powder, electrically conductive, ground polymers, colored pigments. Carbon black and other electrically conductive additives such as graphite, metal powder, ground, electrically conductive polymers are suitable as fillers in particular because they lead to a certain conductivity of the sealant composition in coating by means of a CDC paint, which has an advantageous effect on coatability.

Suitable fillers (F) include both the organically coated and the uncoated forms that are available commercially and are known to those skilled in the art.

The total amount of total fillers (F) is preferably 3-50% by weight, especially 5-35% by weight, in particular 5-25% by weight, based on the weight of the total composition.

The polyisocyanates (PI) are oligomers or derivatives of monomeric diisocyanates, in particular HDI, IPDI, TDI and MDI which may act as crosslinking agent and/or as adhesion promoters in the heat-curing sealant composition. Suitable polyisocyanates (PI) include, for example, HDI biurets, which are commercially available as Desmodur® N 100 and N 3200 (from Bayer), for example; Tolonate® HDB and HDB-LV (from Rhodia) and Duranate® 24A-100 (from Asahi Kasei); HDI isocyanurates, for example, as Desmodur® N 3300, N 3600 and N 3790 BA (all from Bayer), Tolonate® HDT, HDT-LV and HDT-LV2 (from Rhodia), Duranate® TPA-100 and THA-100 (from Asahi Kasei) and Coronate® HX (from Nippon Polyurethane); HDI uretdiones, for example, as Desmodur® N 3400 (from Bayer); HDI iminooxadiazine diones, for example, as Desmodur® XP 2410 (from Bayer); HDI allophanates, for example, as Desmodur® VP LS 2102 (from Bayer); IPDI isocyanurates, for example, in solution as Desmodur® Z 4470 (from Bayer) or in solid form as Vestanat® T1890/100 (from Evonik); TDI oligomers, for example, as Desmodur® IL (from Bayer); as well as mixed isocyanurates based on TDI/HDI, for example, as Desmodur® HL (from Bayer). In addition, forms of MDI that are liquid at room temperature (so-called "modified MDI"), which are mixtures of MDI with MDI derivatives are also suitable, for example, MDI carbodiimides and/or MDI uretonimines or MDI urethanes, which are known, for example, under brand names such as Desmodur® CD, Desmodur® PF, Desmodur® PC (all from Bayer) and mixtures of MDI and MDI homologs (polymeric MDI or PMDI), that can be obtained under brand names such as Desmodur® VL, Desmodur® VL50, Desmodur® VL R10, Desmodur® VL R20 and Desmodur® VKS 20F (all from Bayer), Isonate® M 309, Voranate® M 229 and Voranate® M 580 (all from Dow) or Lupranat® M 10 R (from BASF).

Forms of MDI that are liquid at room temperature are preferred as the polyisocyanate (PI) as well as the oligomers of HDI, IPDI and TDI, in particular the isocyanurates and the biurets.

The reactive diluents (G) containing epoxy groups include in particular:
glycidyl ethers of monofunctional saturated or unsaturated branched or unbranched cyclic or open-chain $C_4$ to $C_{30}$ alcohols, in particular selected from the group consisting of butanol glycidyl ether, hexanol glycidyl ether, 2-ethylhexanol glycidyl ether, allyl glycidyl ether, tetrahydrofurfuryl and furfuryl glycidyl ether, trimethoxysilyl glycidyl ether.
glycidyl ethers of difunctional saturated or unsaturated branched or unbranched cyclic or open-chain $C_2$ to $C_{30}$ alcohols, in particular selected from the group consisting of ethylene glycol, butanediol, hexanediol, octane-diol glycidyl ether, cyclohexane dimethanol diglycidyl ether and neopentyl glycol diglycidyl ether.

glycidyl ethers of tri- or polyfunctional saturated or unsaturated branched or unbranched cyclic or open-chain alcohols such as epoxidized castor oil, epoxidized trimethylolpropane, epoxidized pentaerythritol or polyglycidyl ethers of aliphatic polyols such as sorbitol, glycerol or trimethylolpropane.

glycidyl ethers of phenol and aniline compounds, in particular selected from the group consisting of phenyl glycidyl ether, cresyl glycidyl ether, p-tert-butylphenylglycidyl ether, nonylphenol glycidyl ether, 3-n-pentadecenyl glycidyl ether (from cashew nut shell oil), N,N-diglycidylaniline and triglycidyl of p-aminophenol.

epoxidized amines such as N,N-diglycidyl cyclohexylamine.

epoxidized mono- or dicarboxylic acids, in particular selected from the group consisting of neodecanoic acid glycidyl ester, methacrylic acid glycidyl ester, benzoic acid glycidyl ester, phthalic acid, tetra- and hexahydrophthalic acid diglycidyl ester and diglycidyl esters of dimeric fatty acids as well as terephthalic acid and trimellitic acid glycidyl ester;

epoxidized di- or trifunctional low- to high-molecular polyether polyols, in particular polyethylene glycol diglycidyl ethers or polypropylene glycol diglycidyl ethers.

Hexanediol diglycidyl ether, cresyl glycidyl ether, p-tert-butylphenyl glycidyl ether, polypropylene glycol diglycidyl ether and polyethylene glycol diglycidyl ether are especially preferred.

The total amount of the reactive diluent (G) containing epoxy groups is advantageously 0.1-20% by weight, preferably 1-8% by weight, based on the weight of the total composition.

Heat-activatable curing agents or accelerators (B') are in particular guanamines, guanidines, aminoguanidines and derivatives thereof; substituted ureas, imidazoles and imidazole salts, imidazolines, amidoamines and iminoamines.

Especially preferred heat-activatable curing agents or accelerators (B') include substituted ureas, in particular 3-(3-chloro-4-methylphenyl)-1,1-dimethylurea (chlortolurone) or aryldimethylureas, in particular p-chlorophenyl-N,N-dimethylurea (monuron), 3-phenyl-1,1-dimethylurea (fenuron) or 3,4-dichlorophenyl-N,N-dimethylurea (diuron), N,N-dimethylurea, N-isobutyl-N',N'-dimethylurea, 1,1'-(hexane-1,6-diyl)-bis-(3,3'-dimethylurea) as well as imidazoles and imidazole salts.

Also especially preferred as a heat-activatable curing agent or accelerator (B') is an amidoamine having a primary amino group, in particular one that is obtained by reaction of phthalic anhydride and a polyamine having primary amino groups, in particular diethylenetriamine (DETA) or triethylenetetramine (TETA).

In another especially preferred embodiment, the heat-curing sealant composition additionally contains at least one catalyst (KA) which accelerates the hydrolysis of aldimino groups. Such catalysts (KA) include in particular acids, for example, organic carboxylic acids such as benzoic acid, salicylic acid or 2-nitrobenzoic acid, organic carboxylic anhydrides such as phthalic anhydride, hexahydrophthalic anhydride and hexahydromethylphthalic anhydride, silyl esters of organic carboxylic acids, organic sulfonic acids such as methane sulfonic acid, p-toluene sulfonic acid or 4-dodecylbenzene sulfonic acid, sulfonic acid esters, other organic or inorganic acids or mixtures of the acids and acid esters mentioned above. Salicylic acid or 2-nitrobenzoic acid is most preferably used as the catalyst (KA).

In addition, it is especially advantageous if the heat-curing sealing composition additionally contains at least one catalyst (KN) which accelerates the reaction of the isocyanate groups. Such catalysts (KN) that accelerate the reaction of isocyanate groups include in particular organotin compounds such as dibutyltin diacetate, dibutyltin dilaurate, dibutyltin dichloride, dibutyltin diacetylacetonate and dioctyltin dilaurate, bismuth compounds such as bismuth trioctoate and bismuth tris-neodecanoate and compounds containing tertiary amino groups such as 2,2'-dimorpholinodiethyl ether and 1,4-diazabicyclo-[2.2.2] octane.

In addition, it is especially advantageous if the heat-curing sealant composition additionally contains at least one rheology modifier (R). Such rheology modifiers (R) include in particular thickeners or thixotropy agents, for example, urea compounds, polyamide waxes, bentonites or pyrogenic silicas.

In addition, it is especially advantageous if the heat-curing sealant composition further contains at least one impact strength modifier (SM). In particular, polyurethane polymers that have been reacted with hydroxy-functional polyepoxies, in particular those disclosed by formula (II) in US 2009/0288766 A1 or US 2010/0035041 A1, in particular by their formula (I), the entire contents of these patents is included herein by this reference), have proven to be especially suitable impact strength modifiers (SM). In particular the reaction products of the isocyanate group-containing polyurethane polymer (PUP) with the hydroxy-functional substances occurring in the epoxy resin (A), these reaction products being formed in the premix already described above, in particular the compound of formula (XII) are also examples of such impact strength modifiers (SM).

The heat-curing sealant composition preferably consists essentially, i.e., in particular more than 95% by weight, of:
  epoxy resin (A) with an average of more than one epoxy group per molecule
  dicyanodiamide or an amine complex of a Lewis acid
  polyurethane polymer (PUP) containing isocyanate groups
  polyaldimine (PA)
  filler (F)
  reactive diluent (G) containing epoxy groups
  heat-activatable curing agent or accelerator (B')
  plasticizer
  catalyst (KA), which accelerates the hydrolysis of aldimino groups
  catalyst (KN), which accelerates the reaction of isocyanate groups
  rheology modifier (R)
  impact strength modifier (SM).

It is self-evident that in the epoxy resin (A), the heat-activatable curing agent or accelerator (B), the polyurethane polymer (PUP) having isocyanate groups, the polyaldimine (PA), the filler (F), the reactive diluent (G) containing epoxy groups, heat-activatable curing agent or accelerator (B'), catalyst (KA), catalyst (KN) and the rheology modifier (R) in the present invention are each different substances.

In one embodiment, the composition additionally contains at least one physical or chemical blowing agent, in particular in an amount of 0.1% to 3% by weight, based on the weight of the composition. Preferred blowing agents are chemical blowing agents which release a gas when heated to a temperature of 100 to 200° C. in particular.

These may be exothermic blowing agents such as, for example, azo compounds, hydrazine derivatives, semicarbazide or tetrazoles. Azodicarbonamide and oxy-bis-benzenesulfonylhydrazide, which release energy in decomposition, are preferred. Also suitable are endothermal blowing agents such as sodium bicarbonate/citric acid mixtures. Such chemical blowing agents are available under the brand name Celogen™ from the company Chemtura, for example. Also suitable are physical blowing agents such as those distributed under the brand name Expancel™ by the company Akzo Nobel.

Especially suitable blowing agents are those that are available under the brand names Expancel™ from the company Akzo Nobel or Celogen™ from the company Chemtura.

The heat-curing sealant composition is prepared and stored in the absence of moisture. It is stable in storage, i.e., it can be stored for a period of several months or up to a year or even more in the absence of moisture in a suitable package or configuration, for example, a drum, a bag or a cartridge without any changes in application properties or in its properties after curing of an extent that would be relevant for use thereof. The storage stability is usually determined by measuring the viscosity.

The heat-curing sealant composition described in detail above is highly suitable for use as a sealant.

The heat-curing sealant composition is characterized by an extraordinary combination of rapid skin formation and high tensile strength. It preferably has a skin-forming time of less than 120 minutes, in particular 10 to 100 minutes, especially preferably 20 to 90 minutes, as well as a tensile strength of more than 2.5 MPa, in particular more than 2.8 MPa, especially preferably more than 2.9 MPa, measured according to DIN EN ISO 527.

Within the context of the present invention, the skin-forming time is determined by the method described in detail in the "Examples" section below.

Furthermore, the heat-curing sealant compositions are largely elastic after being cured by heat and may have an extraordinarily good impact strength. This is especially advantageous in the case of seals that are exposed to impacts or movements during use.

This combination of rapid skin formation and high strength makes it possible for the heat-curing sealant composition to be usable as a sealant in auto body work in particular, in particular in the engine space or for doors, trunk lids, tailgates or hoods. In particular it may also be used as the sealant in flange fold seals, such as those disclosed in WO 2008/077918 A1.

In another aspect of the present invention, a method for sealing which comprises the following steps, is disclosed:
i) Applying a heat-curing sealant composition, such as that described above, to a substrate (S), so that a portion of the surface of the sealant composition is in contact with air;
ii) Forming a skin on the surface of the sealant composition, which is in contact with the air;
iii) Heating the sealant composition to a temperature above 120° C., in particular between 160° C. and 220° C., to form a cured sealant composition.

Materials suitable for substrate (S) include in particular metals, in particular those metals which are used in the construction of vehicle bodies of automobiles in particular. These include in particular steels, especially electrolytically galvanized, flame galvanized, oiled steel, Bonazinc-coated steel and subsequently phosphatized steel, or aluminum, in particular in the variants that typically occur in automotive engineering. These include steel plates or aluminum plates in particular.

The application, i.e., the deposition, is preferably performed automatically and in particular in the form of a bead. However, the sealant composition may also be sprayed on. Other application methods such as swirl application, flat-stream spraying, mini-flat stream spraying and thin-stream spraying at speeds of >200 mm/s or the like are also conceivable. In addition, a manual application or manual reworking of the applied sealant composition by spatula or paintbrush is also possible.

Thus, in another aspect, the present invention also relates to a coated substrate obtained by applying a heat-curing sealant composition such as that described in detail above to the surface of a substrate.

In an especially preferred embodiment, the heat-curing sealant composition is applied to an oiled steel plate. The advantage of the composition that it adheres well to such a substrate and develops a skin rapidly results in the fact that a heat-curing sealant composition can be coated quickly with a paint.

It is thus preferable for a step iia) to be performed between step ii) and step iii):
iia) Applying a paint, in particular a CDC paint, to the sealant composition.

Those skilled in the art of automotive engineering are extremely familiar with the concept of a CDC paint, which refers to a paint applied to sheet metal in a CDC bath (CDC=cathodic dip coating).

Step iii) is preferably performed in a CDC oven.

By heating the heat-curing sealant composition, further curing takes place, so that the sealant composition receives its final strength.

The heat-curing sealant composition is suitable for sealing gaps in particular.

It is thus preferable for the heat-curing sealant composition to be applied in or to a gap in step i), said gap being bordered by two surfaces of the substrate (S) and a second substrate (S2), the second substrate (S2) being made of the same material as the substrate (S) or a different material.

The heat-curing sealant composition is applied in particular in areas where one plate of sheet metal protrudes over a second plate, thus exposing a cut surface and/or a cut edge. The heat-curing sealant composition is applied in such a way that this cut edge and cut surface are covered. The sealant composition thus not only covers the gap but also covers the cut edge and thereby makes it possible to provide corrosion protection to both.

Thus a sealed article is obtained by the method described above.

DESCRIPTION OF THE DRAWINGS

The invention is described in greater detail below on the basis of preferred exemplary embodiments with the help of the figures, and it should be pointed out that only the elements essential for a direct understanding of the invention are shown here. The same elements are identified using the same reference numerals in the different figures. In addition, it should be pointed out that the figures shown here are schematic diagrams without any reference to size.

In the drawings.

FIGS. 1, 3, 4 and 5 also show individual intermediate steps of a method for sealing.

FIG. 1 shows schematically two substrates (S) 2, (S2) 3, which are joined together, for example, by an adhesive or a spot weld. The specific embodiment here shows a joint comprised of two overlapping plates of sheet metal (S) 2, (S2) 3. There is a gap 13 between the plates of sheet metal. The plates are oiled at the surface. The first plate (S) 2 has a cut surface 10. This cut surface no longer has any oil on the sheet metal surface—due to the cutting operation.

FIG. 2 serves to illustrate one of the main problems with the approach according to the prior art. FIG. 2 shows schematically a joint like that shown in FIG. 1 in which a paint 12, in particular a CDC paint 12, has been applied to the joint 1' without the use of a sealant according to the invention. For the sake of simplicity, the application of paint is shown on only one side of the joint. A location where the paint has not been deposited and the metal has not been covered is formed on the cut edge 11 in particular. This cut edge 11 is part of the cut face 10, which no longer has an oil coating.

FIG. 3 shows schematically a joint 1, such as that shown in FIG. 1, in which a heat-curing sealant composition 4 according to the invention has been applied in a first step i) to a substrate (S) 2, i.e., the first sheet metal plate, so that a portion of the surface 5 of the sealant composition is in contact with air 6. In addition, the sealant has been applied in such a way that it is also applied to the second sheet metal plate. Then in step ii) a skin 7 forms on the surface of the sealant composition that is in contact with the air 6.

FIG. 4 shows schematically the joint 1 as described above in conjunction with FIG. 3, with which a paint 12, in particular a CDC paint 12, is now applied in a step iia) following step ii). For the sake of simplicity, the application of paint is shown only on one side of the joint here—as is also shown in FIG. 2. The paint 12 covers the surface (outer surface, i.e., exposed to the paint bath) of the joint body completely. In particular it covers the cut edge 11 as well as the cut face 10 completely, so that the two substrates are protected well.

Finally, FIG. 5 shows schematically the joint 1 as described in conjunction with FIG. 4, in which the sealant composition is now heated to a temperature of more than 140° C., in particular between 160° C. and 200° C. in a subsequent additional step iii). This heating is performed by a heat source 8 and is represented here schematically by a CDC oven. The sealant composition 4 is cured as a result of the heating, forming a fully cured sealant composition 9. A sealed article 14 is thus formed. The cut edges 11 and cut faces 10 of the sheet metal are protected well and reliably from the effects of corrosive media in this sealed article.

EXAMPLES

Figure 1:
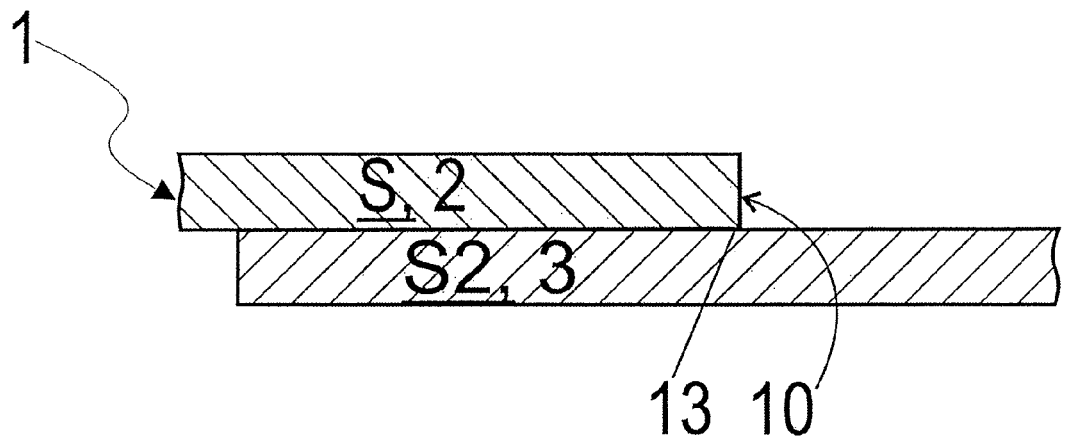
FIG. 1 shows a schematic cross section through a joining site of two sheet metals.
Figure 2:
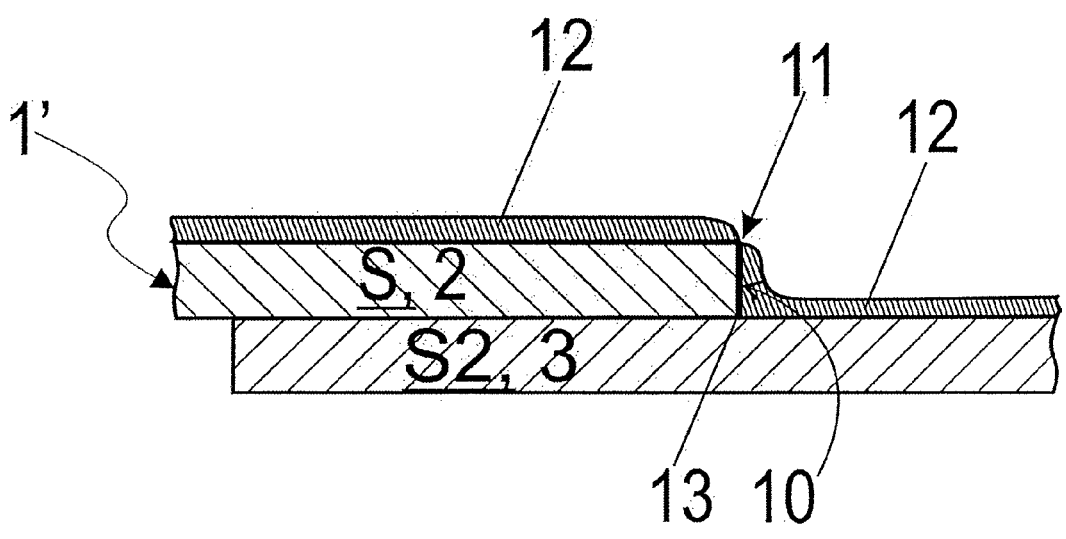
FIG. 2 shows a schematic cross section through a joining site after treatment with CDC paint without the use of the sealant according to the invention.
Figure 3:
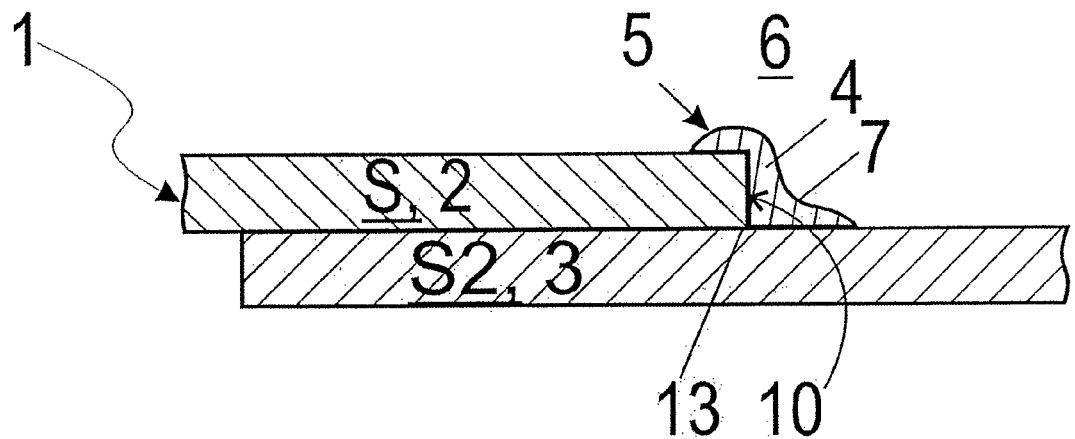
FIG. 3 shows a schematic cross section through a joining site after application of the sealant.
Figure 4:
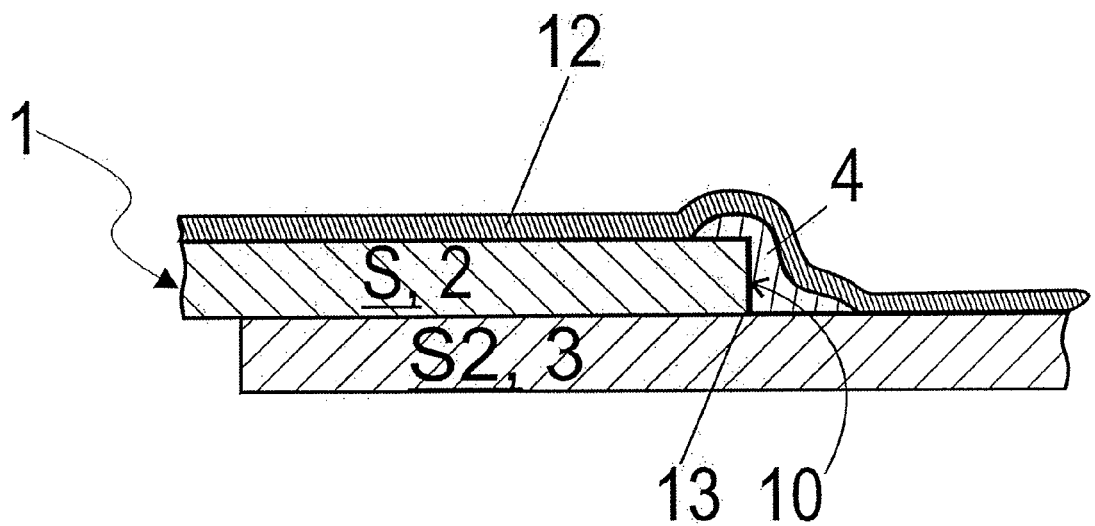
FIG. 4 shows a schematic cross section through a joining site after treatment with CDC paint using the sealant according to the invention.
Figure 5:
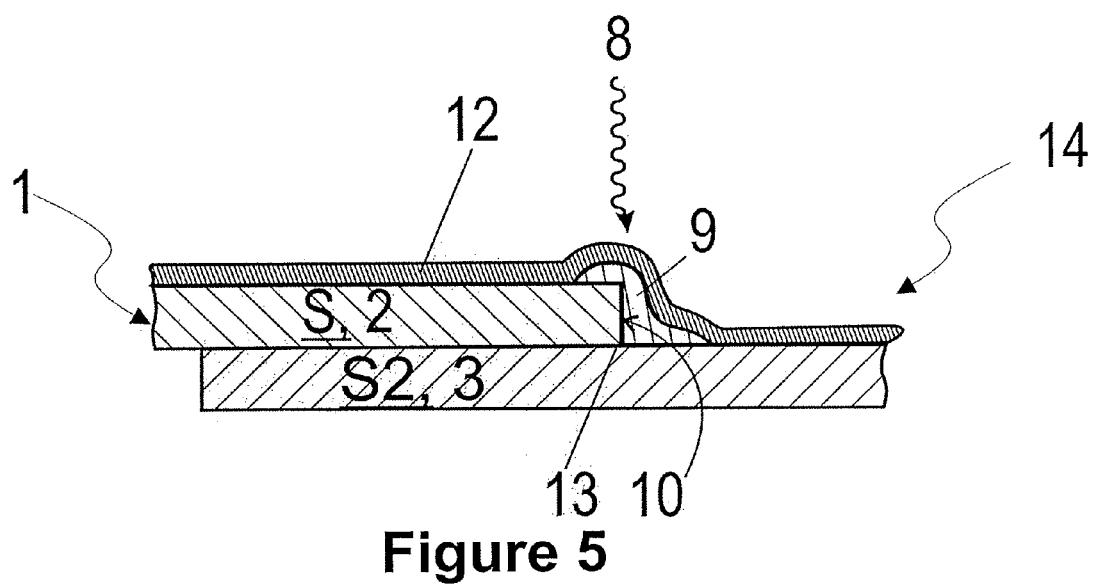
FIG. 5 shows a schematic cross section through a joining site after treatment with CDC paint using the sealant according to the invention and with a heat treatment.

The examples presented below serve only to illustrate the present invention.

Table 1 lists the raw materials that were used.

TABLE 1

| Raw materials used. | |
|---|---|
| D.E.R. 330 (bisphenol A diglycidyl ether = "DGEBA") | Dow |
| Poly bd® R-45HTLO (hydroxyl-terminated polybutadiene) (OH equivalent weight = approx. 1200 g/Eq) | Arkema |
| Isophorone diisocyanate (= "IPDI") | Evonik |
| 1-Amino-3-aminomethyl-3,5,5-trimethyl cyclohexane (isophorone diamine = "IPDA") | Evonik |
| Omicure® BC-120 (= "BC120") (BCl$_3$ amine complex) | Emerald Performance Materials |
| Dicyanodiamide (= "Dicy") (micronized: grain size: 98% < 6 μm) | Evonik |

Preparing a Premix Containing Epoxy Resin and Polyurethane Polymer Having Isocyanate Groups: VM1

417.5 g of Poly bd® R-45HTLO and 154.2 g of DGEBA were stirred together with 328.6 g of diisodecyl phthalate (DIDP) in vacuo at 80° C. A 0.8 g of catalyst solution (10% by weight dibutyltin dilaurate (DBTDL) in diisononyl phthalate) was added. Next, 98.9 g of IPDI was added while stirring and the mixture was stirred for 2 hours at 80° C. The premix of polyurethane polymer and epoxy resin thus formed had an NCO content of 1.6% by weight and an epoxy content of 0.82 mol Eq/kg. The premix identified as VM1 was used as is.

Preparing a Polyaldimine PA-1

A round-bottom flask was charged with 14.55 g of IPDA under a nitrogen atmosphere. While stirring vigorously, 30.00 g of 2,2-dimethyl-3-(N-morpholino)propanal was added from a dropping funnel. Next, the volatile ingredients were removed in vacuo (10 mbar, 80° C.). Yield: 40.9 g of a clear, colorless oil having an amine content of 8.29 mmol N/g.

Preparing a Polyaldimine PA-2

A round-bottom flask was charged with 20.00 g of IPDA under a nitrogen atmosphere. While stirring vigorously and cooling with ice, 18.63 g of isobutyraldehyde was added from a dropping funnel, and the mixture was then stirred for 30 minutes at room temperature. Next, the volatile ingredients were removed in vacuo (10 mbar, 80° C.). Yield: 32.6 g of a clear, colorless oil with an amine content of 7.17 mmol N/g.

Preparing Heat-Curing Sealant Compositions

Using the ingredients indicated in parts by weight in Table 2, various heat-curing sealant compositions were prepared in the absence of moisture. After their preparation, the compositions were packaged in moisture-proof aluminum cartridges and were used directly for testing.

Measurement Methods

The following properties of the compositions were measured:

Formation of a Skin

To determine the skin formation time ("SFT"), the sealant at room temperature was applied to cardboard in a layer thickness of approx. 3 mm and the time until no residues of sealant remained on the pipette for the first time when tapping lightly on the surface of the sealant by means of a pipette made of LDPE, was determined in a standard atmosphere (SIP; 23±1° C., 50±5% relative humidity).

Tensile Strength

To determine the tensile strength, the sealant was applied to a PTFE sheet, covered with another PTFE sheet and then pressed to yield a layer thickness of 2 mm and then cured for 20 minutes at 175° C. Tensile strength test specimens were punched from the film formed in this way and used to determine the tensile strength according to DIN EN 527 at a drawing rate of 200 mm/min with the results shown in Table 2. If no test specimen could be prepared, "x" is shown in the table.

Curing

The heat-curing sealant composition is applied in the form of a triangular bead to an oiled (3 g/m²) steel plate (plain galvanized) (100 mm×25 mm×0.7 mm) by means of a nozzle screwed onto the cartridge. This is then cured for 35 minutes at 175° C. When the bead has cooled to room temperature, it is bent over a mandrel with a diameter of 5 cm. After bending, the bead is cut at the center and peeled away from the substrate by hand (in any case it is necessary to cut open the bead near the substrate). If the curing is complete, the entire bead will be cured and the evaluation of "yes" is given in Tables 2 and 3. If the sealant material in the interior of the bead is still as soft as it was at the time of application, then the curing has hardly taken place and the evaluation of "no" is given in Tables 2 and 3. If only small amounts of the material in the interior have not cured, then the curing is inadequate and the evaluation of "partial" is given in Tables 2 and 3.

LIST OF REFERENCE NUMERALS 1, 1' Joint
2, S First substrate
3, S2 Second substrate
4 Heat-curing sealant composition
5 Surface of the sealant composition
6 Air
7 Skin
8 Heat source
9 Cured sealant composition
10 Cut face
11 Cut edge
12 Paint, CDC paint
13 Gap
14 Sealed article

The invention claimed is:

1. A heat-curing sealant composition, comprising:
at least one epoxy resin (A) with an average of more than one epoxy group per molecule;

TABLE 2

Compositions and properties.

| | 1 | 2 | R1 | R2 | R3 | R4 | R5 | R6 | R7 | 3 | R8 | R9 |
|---|---|---|---|---|---|---|---|---|---|---|---|---|
| VM1 | 47.7 | 47.7 | 47.7 | 47.7 | 47.7 | 47.7 | 47.7 | 47.7 | 47.7 | 47.7 | 47.7 | 47.7 |
| Dicy | 1.0 | | | | | | | | | 1.0 | | |
| BC 120 | | 1.0 | | | | | | | | | | |
| DMA[1] | | | 1.0 | | | | | | | | | |
| 2-Methyl-imidazole | | | | 1.0 | | | | | | | | |
| PSA[2] | | | | | 1.0 | | | | | | | |
| Adipic dihydrazide | | | | | | 1.0 | | | | | | |
| Amido-amine[3] | | | | | | | | 2.0 | 2.0 | | | 2.0 |
| Catalyst[4] | 1.2 | 1.2 | 1.2 | 1.2 | 1.2 | 1.2 | 1.2 | 1.2 | 1.2 | 1.2 | 1.2 | 1.2 |
| PA-1 | | | | | | | | | | 1.8 | 1.8 | 1.8 |
| PA-2 | 1.2 | 1.2 | 1.2 | 1.2 | 1.2 | 1.2 | 1.2 | 1.2 | | | | |
| Chalk | 35.2 | 35.2 | 36.2 | 35.2 | 35.2 | 35.2 | 35.2 | 34.2 | 33.9 | 34.6 | 35.6 | 33.6 |
| Calcium oxide | 3.7 | 3.7 | 3.7 | 3.7 | 3.7 | 3.7 | 3.7 | 3.7 | 3.7 | 3.7 | 3.7 | 3.7 |
| SiO₂[5] | 10.0 | 10.0 | 10.0 | 10.0 | 10.0 | 10.0 | 10.0 | 10.0 | 10.0 | 10.0 | 10.0 | 10.0 |
| SFT[6] [min] | 30 | 90 | 60 | 30 | n.g.[7] | 30 | 90 | 120 | >240 | 30 | 180 | 150 |
| TS[8] [MPa] | 3 | 3 | x | x | x | x | x | 2 | 1 | 3 | x | 2 |
| Curing | Yes | Yes | No | No | Partial | No | No | Yes | Yes | Yes | No | Yes |

[1]DMA = N,N-dimethylurea
[2]PSA = pyromellitic anhydride
[3]Amidoamine = 1:1 adduct of phthalic anhydride and diethylenetriamine
[4]Catalyst = 1% by weight benzoic acid in diisononyl phthalate
[5]SiO₂ = pyrogenic silica
[6]SFT = skin forming time
[7]n.m. = not measured
[8]TS = tensile strength Table 2 shows that the inventive examples 1, 2 and 3 containing dicyanodiamide or an amine complex of a Lewis acid have a good combination of fast skin formation, high tensile strength and good curing. Comparative examples R1, R2, R3, R4 and R5 containing other heat-activatable curing agents or accelerators that are used in epoxy chemistry do not undergo curing in the heat or the curing is incomplete. The comparative examples R6 or R7 which contain an amidoamine, which in turn contains a primary amino group that is a 1:1 adduct of phthalic anhydride and diethylenetriamine, do cure well but they have a long skin forming time and a lower tensile strength. The comparison of example 3 with comparative examples R8 and R9 also shows that no heat curing occurs at all in the absence of dicyanodiamide or without an amine complex of a Lewis acid (R8). Although adding the amidoamine resulting in good curing, it leads to a long skin-forming time and a lower tensile strength.

at least one heat-activatable curing agent or accelerator (B) selected from the group consisting of dicyanodiamide and an amine complex of a Lewis acid;
at least one polyurethane polymer (PUP) containing isocyanate groups; and
at least one polyaldimine (PA);
wherein:
a weight ratio of the epoxy resin (A) to the polyurethane polymer (PUP) containing isocyanate groups is in a range between 0.1:1 and 0.5:1;
the polyurethane polymer (PUP) is obtained from a reaction between at least one polyol and at least one polyisocyanate; and
the polyol has an average molecular weight of 250 to 30,000 g/mol.

2. The heat-curing sealant composition according to claim 1, wherein the weight ratio of the epoxy resin (A) to the polyurethane polymer (PUP) containing isocyanate groups is in a range between 0.15:1 and 0.4:1.

3. The heat-curing sealant composition according to claim 1, wherein the polyaldimine (PA) is present in the sealant composition in an amount such that a ratio of a number of aldimino groups to a number of isocyanate groups has a value in a range of from 0.2:1 to 0.8:1.

4. The heat-curing sealant composition according to claim 1, wherein the polyaldimine (PA) does not have a hydrogen atom on the carbon atom in α-position to the carbon of the aldimino group.

5. The heat-curing sealant composition according to claim 1, wherein the polyaldimine (PA) has formula (I)

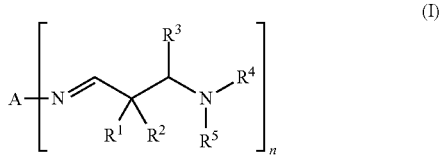

(I)

wherein:
A represents a radical of an amine after removal of n primary aliphatic amino groups and does not contain any active hydrogen atoms,
n represents 2 or 3,
$R^1$ and $R^2$ either,
independently of one another, each represents a monovalent hydrocarbon radical, each having 1 to 12 carbon atoms, or
together represent a divalent hydrocarbon radical having 4 to 12 carbon atoms, which is part of an optionally substituted carbocyclic ring having 5 to 8 carbon atoms,
$R^3$ represents a hydrogen atom, an alkyl group, an aralkyl group, or an alkoxycarbonyl group;
$R^4$ and $R^5$ either,
independently of one another, each represents a monovalent aliphatic, cycloaliphatic, or araliphatic radical having 1 to 20 carbon atoms, optionally containing heteroatoms in a form of an ether oxygen or a tertiary amine nitrogen, or
together represent a divalent aliphatic radical having 3 to 20 carbon atoms, which is part of an optionally substituted heterocyclic ring having 5 to 8 ring atoms, the heterocyclic ring optionally containing, in addition to the nitrogen atom, further heteroatoms in a form of ether oxygen or tertiary amine nitrogen.

6. The heat-curing sealant composition according to claim 1, wherein the dicyanodiamide has an average particle size of less than 12 μm.

7. The heat-curing sealant composition according to claim 1, further comprising at least one catalyst (KA) that accelerates hydrolysis of aldimino groups.

8. The heat-curing sealant composition according to claim 1, further comprising at least one heat-activatable curing agent or accelerator (B') that is selected from the group consisting of guanamines, guanidines, aminoguanidines, derivatives thereof, substituted ureas, imidazoles, imidazole salts, imidazolines, amidoamines, and iminoamines.

9. The heat-curing sealant composition according to claim 8, wherein the curing agent or accelerator (B') is an amidoamine with a primary amino group, which can be obtained by reacting phthalic anhydride and a polyamine with primary amino groups.

10. A coated substrate obtained by applying the heat-curing sealant composition according to claim 1 to a surface of a substrate.

11. A method for sealing, comprising:
i) applying the heat-curing sealant composition according to claim 1 to a substrate so that a portion of a surface of the sealant composition is in contact with air;
ii) forming a skin on the surface of the sealant composition that is in contact with the air;
iii) heating the sealant composition to a temperature of from 160 to 220° C. to form a fully cured sealant composition.

12. The method for sealing according to claim 11, further comprising a step iia) between steps ii) and iii):
iia) applying a paint to the sealant composition.

13. The method according to claim 11, wherein step iii) is performed in a CDC oven.

14. The method according to claim 11, wherein the heat-curing sealant composition in step i) is applied to or into a gap, which is bordered by a surface of the substrate and a surface of a second substrate.

15. A sealed article obtained by the method according to claim 11.

16. The heat-curing sealant composition according to claim 1, wherein the weight ratio of the epoxy resin (A) to the polyurethane polymer (PUP) containing isocyanate groups is in a range between 0.2:1 and 0.3:1.

17. The heat-curing sealant composition according to claim 1, wherein the polyaldimine (PA) is present in the sealant composition in an amount such that a ratio of a number of aldimino groups to a number of isocyanate groups has a value in a range of from 0.3:1 to 0.7:1.

18. The heat-curing sealant composition according to claim 1, wherein the poly has an average molecular weight of 400 to 20,000 g/mol.

19. A heat-curing sealant composition, comprising:
at least one epoxy resin (A) with an average of more than one epoxy group per molecule;
at least one heat-activatable curing agent or accelerator (B) selected from the group consisting of dicyanodiamide and an amine complex of a Lewis acid;
at least one polyurethane polymer (PUP) containing isocyanate groups; and
at least one polyaldimine (PA);
wherein:
a weight ratio of the epoxy resin (A) to the polyurethane polymer (PUP) containing isocyanate groups is in a range between 0.1:1 and 0.5:1;
the polyurethane polymer (PUP) is obtained from a reaction of at least one polyhydrocarbon polyol and at least one polyisocyanate; and
the polyhydrocarbon polyol is selected from the group consisting of polyhydroxy functional polyolefins and polyhydroxy functional polymers of dienes.

20. The heat-curing sealant composition according to claim 19, wherein the polyhydrocarbon polyol has an average molecular weight of 250 to 30,000 g/mol.

* * * * *